United States Patent [19]

Pencheon

[11] Patent Number: 5,511,339
[45] Date of Patent: Apr. 30, 1996

[54] RODENT TRAP

[76] Inventor: Vance R. Pencheon, Christ Church, St. Kitts, St. Kitts/Nevis

[21] Appl. No.: 291,204

[22] Filed: Aug. 16, 1994

[51] Int. Cl.⁶ .................................................. A01M 23/10
[52] U.S. Cl. ........................................ 43/74; 43/70
[58] Field of Search .................... 43/69, 70, 74, 43/69

[56] References Cited

U.S. PATENT DOCUMENTS

| | | | |
|---|---|---|---|
| 421,066 | 2/1890 | Cardozo | 43/70 |
| 1,597,551 | 8/1926 | Stewart | 43/69 |
| 3,064,386 | 11/1962 | Horinek | 43/74 |
| 3,791,065 | 2/1974 | Snow | 43/74 |
| 4,255,891 | 3/1981 | Chen | 43/69 |
| 4,429,483 | 2/1984 | Murakami | 43/74 |
| 5,305,545 | 4/1994 | Cerullo | 43/74 |

FOREIGN PATENT DOCUMENTS

| | | | |
|---|---|---|---|
| 0354725 | 12/1937 | Italy | 43/69 |
| 0046093 | 5/1915 | Sweden | 43/69 |
| 0192326 | 2/1923 | United Kingdom | 43/69 |

Primary Examiner—Richard K. Seidel
Assistant Examiner—James Miner
Attorney, Agent, or Firm—Michael I. Kroll

[57] ABSTRACT

A trap is provided for rodents, such as mice, rats and similar small animals, which consists of a cabinet having an upper entrance, to allow the rodents to enter and a lower chamber to retain the rodents. A platform is provided having a first end and a second end. A component is for pivotally mounting the platform across its center between the first end and the second end within the cabinet. A structure is for maintaining the platform in a normally horizontal position, with its first end level with the upper entrance of the cabinet. A bait bag is suspended in the cabinet directly above the second end of the platform, opposite from the upper entrance to attract the rodents onto the second end of the platform. An apparatus activated by the rodents at the bait bag, is for pivoting the second end of the platform downwardly, so that the rodents will drop into the lower chamber of the cabinet and be retained therein. A device activated by the first end of the platform pivoting upwardly is for returning the platform to its normal horizontal position, after the rodents drop into the lower chamber of the cabinet.

7 Claims, 4 Drawing Sheets

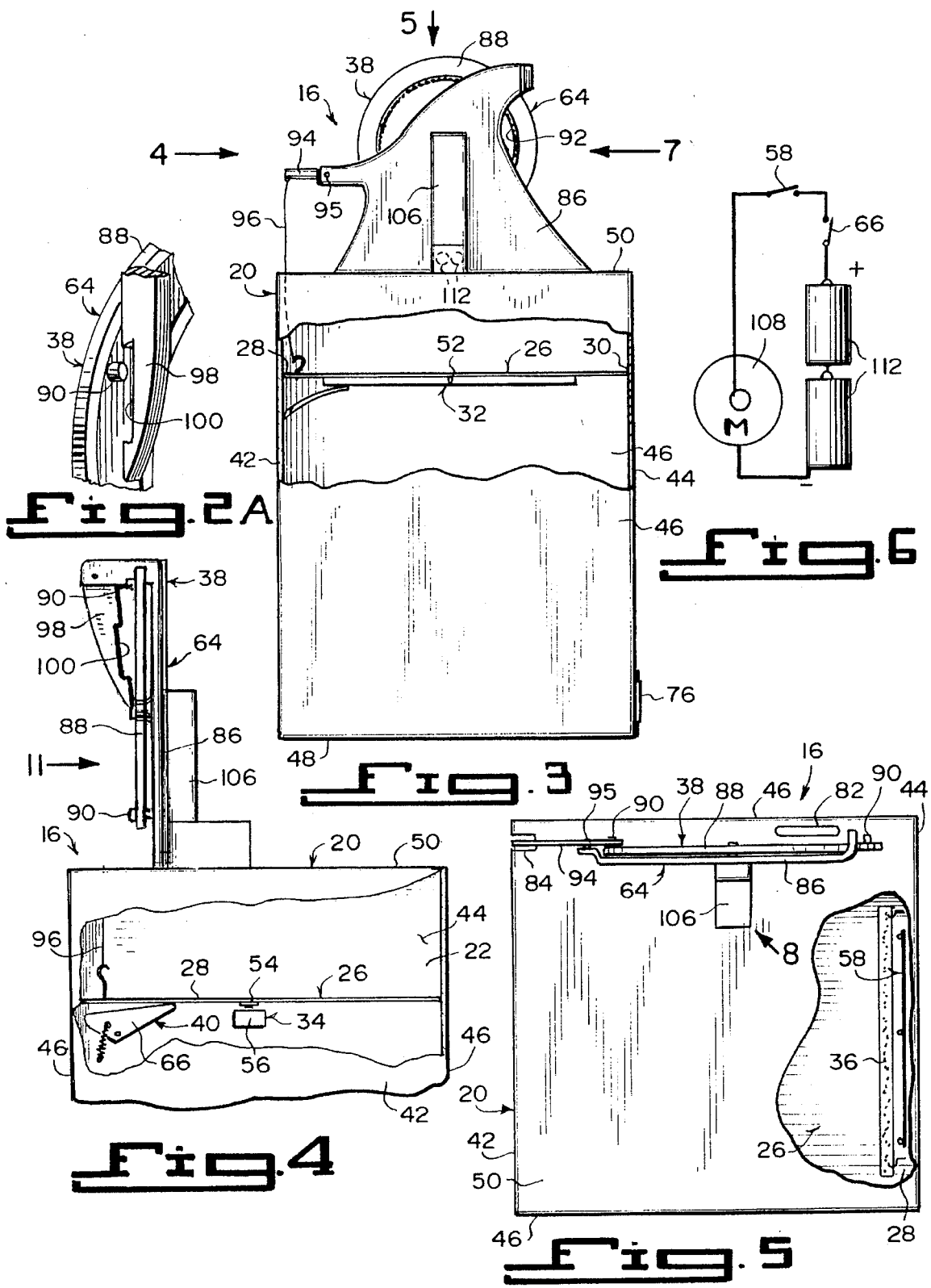

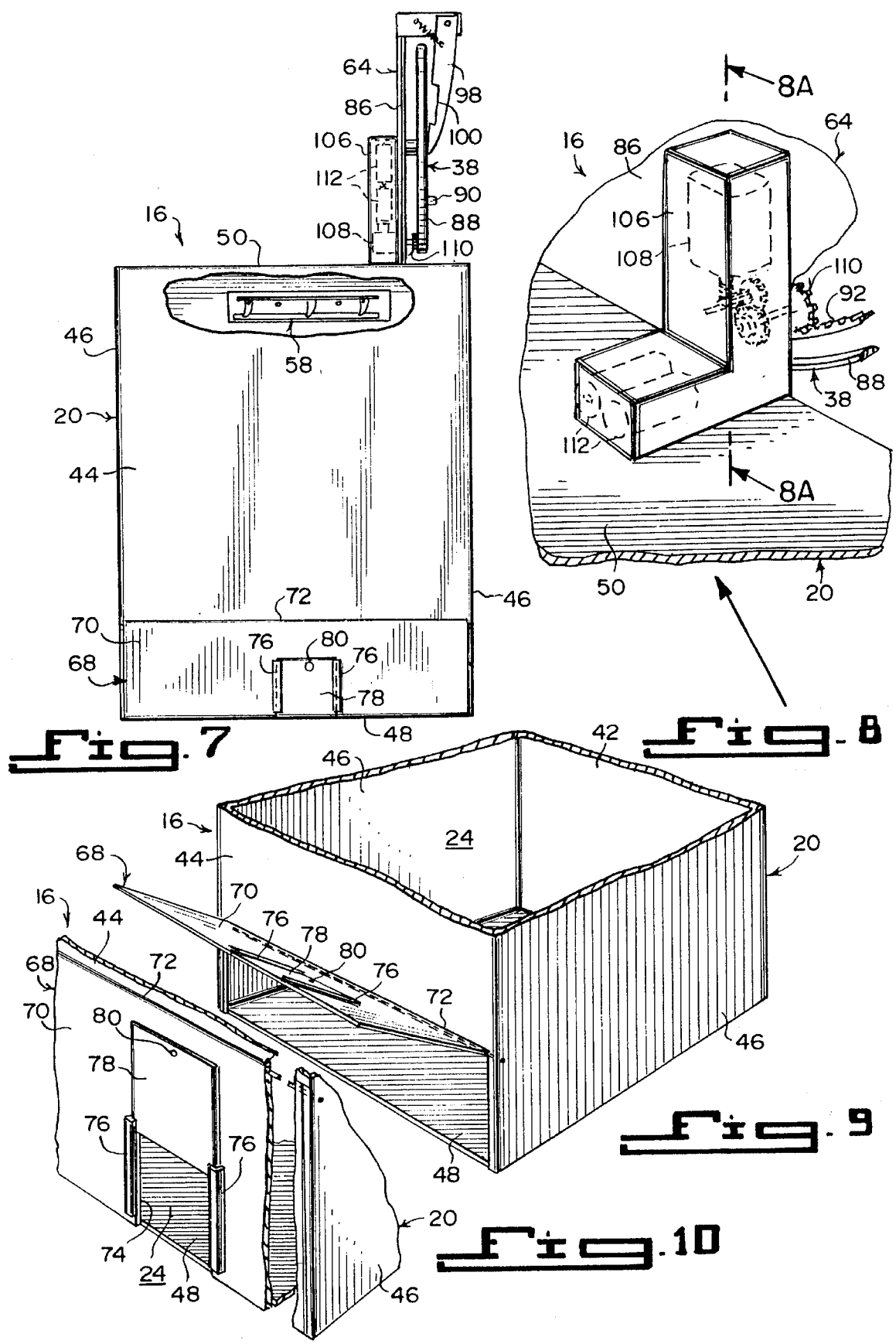

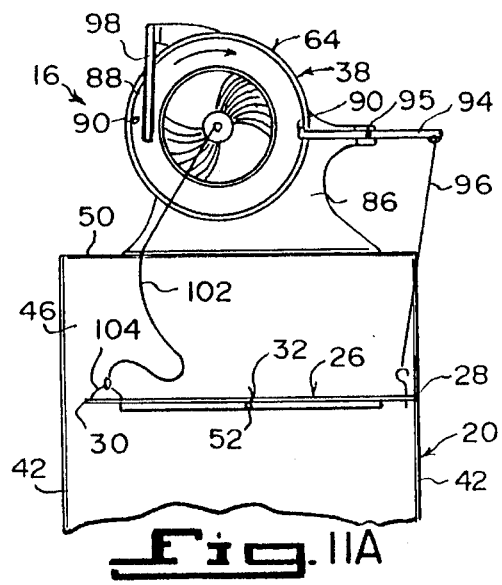
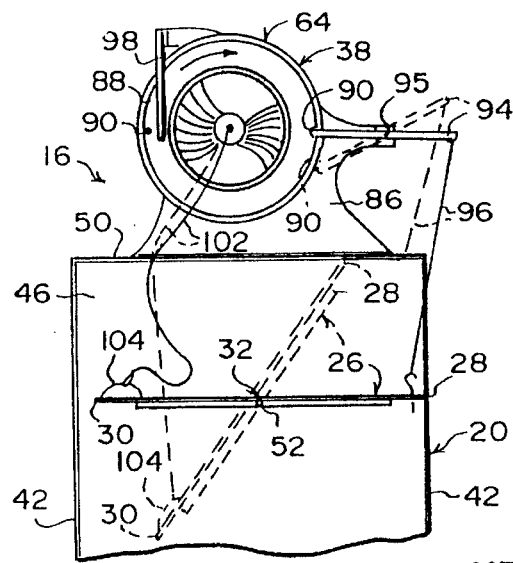
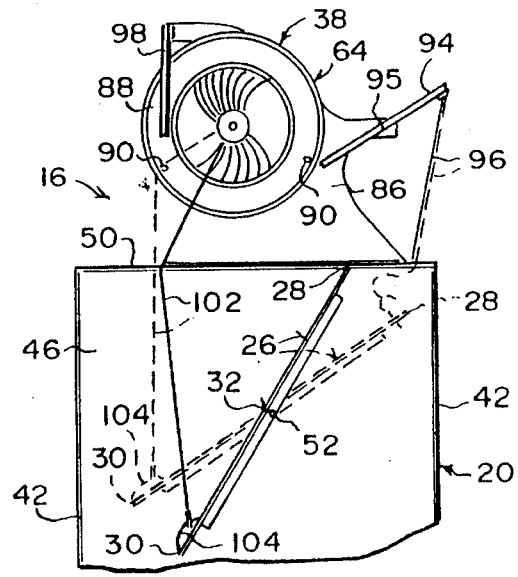
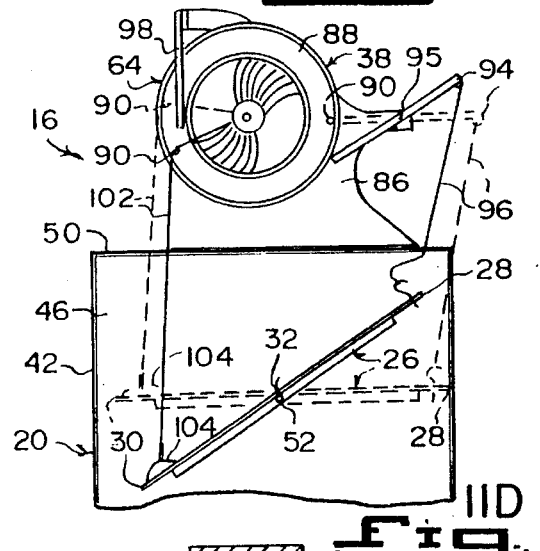
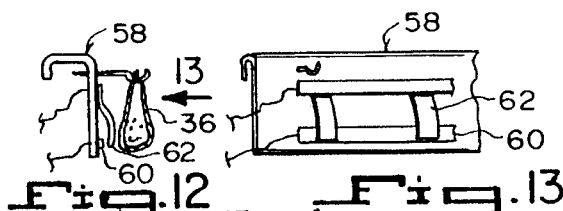
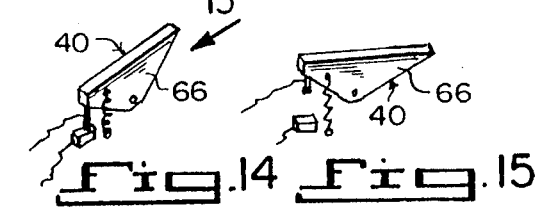
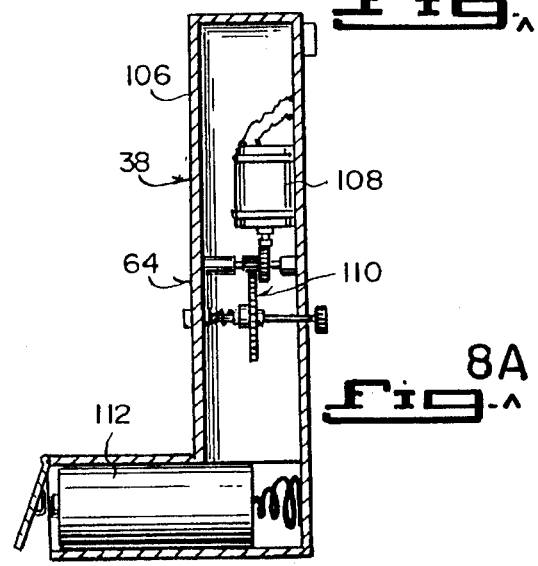

RODENT TRAP

BACKGROUND OF THE INVENTION

1. Field of the Invention

The instant invention relates generally to small animal traps and more specifically it relates to a rodent trap.

2. Description of the Prior Art

Numerous small animal traps have been provided in prior art. For example, U.S. Pat. Nos. 3,778,923 to Cuoco; 4,662,101 to Fisher; 4,665,644 to Vajs et al.; 4,780,985 to Coots; 4,803,799 to Vajs et al.; 5,027,547 to Livshin; 5,107,619 to Zapata et al.; 5,123,200 to Vance; Des. 283,434 to Adrians and Des. 323,016 to Vajs. While these units may be suitable for the particular purpose to which they address, they would not be as suitable for the purposes of the present invention as heretofore described.

SUMMARY OF THE INVENTION

A primary object of the present invention is to provide a rodent trap that will overcome the shortcomings of the prior art devices.

Another object is to provide a rodent trap that will catch rats, mice and other small animals and then reset itself automatically by an electro-mechanical mechanism.

An additional object is to provide a rodent trap that will work continuously, so that it will be ideal for use in heavily infested areas, such as warehouse, supermarkets, hotels, restaurants and farms.

A further object is to provide a rodent trap that is simple and easy to use.

A still further object is to provide a rodent trap that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 2A is an enlarged perspective view as indicated by arrow 2A in FIG. 2.

FIG. 3 is a right side view as indicated by arrow 3 in FIG. 1.

FIG. 4 is a front view of an upper portion thereof with parts broken away as indicated by arrow 4 in FIG. 3.

FIG. 5 is a top view with parts broken away as indicated by arrow 5 in FIG. 3.

FIG. 6 is a circuit diagram of the electrical part of the electro-mechanical mechanism therein.

FIG. 7 is a rear view with parts broken away as indicated by arrow 7 in FIG. 3.

FIG. 8 is a perspective view of a portion thereof, showing the electro-mechanical mechanism assembly as indicated by arrow 8 in FIG. 5.

FIG. 8A is a cross sectional view taken along line 8A—8A in FIG. 8.

FIG. 9 is a rear perspective view of a lower portion of the instant invention as indicated by arrow 9 in FIG. 1, with the large door opened.

FIG. 10 is a rear perspective view of a segment of the lower portion of the instant invention, showing the large door closed and the small door opened.

FIGS. 11A through lid are diagrammatic left side views of an upper portion thereof as indicated by arrow 11 in FIG. 4, showing various positions of the pivotable platform.

Figure 1:
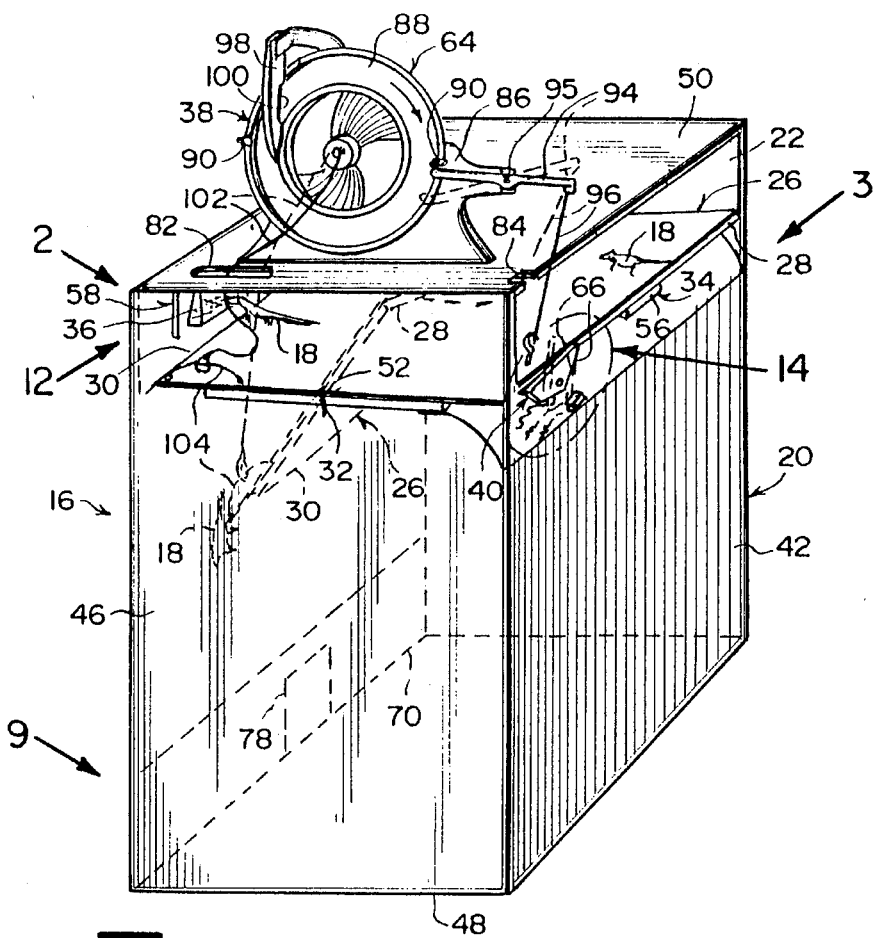
FIG. 1 is a front perspective view of the instant invention.
Figure 2:
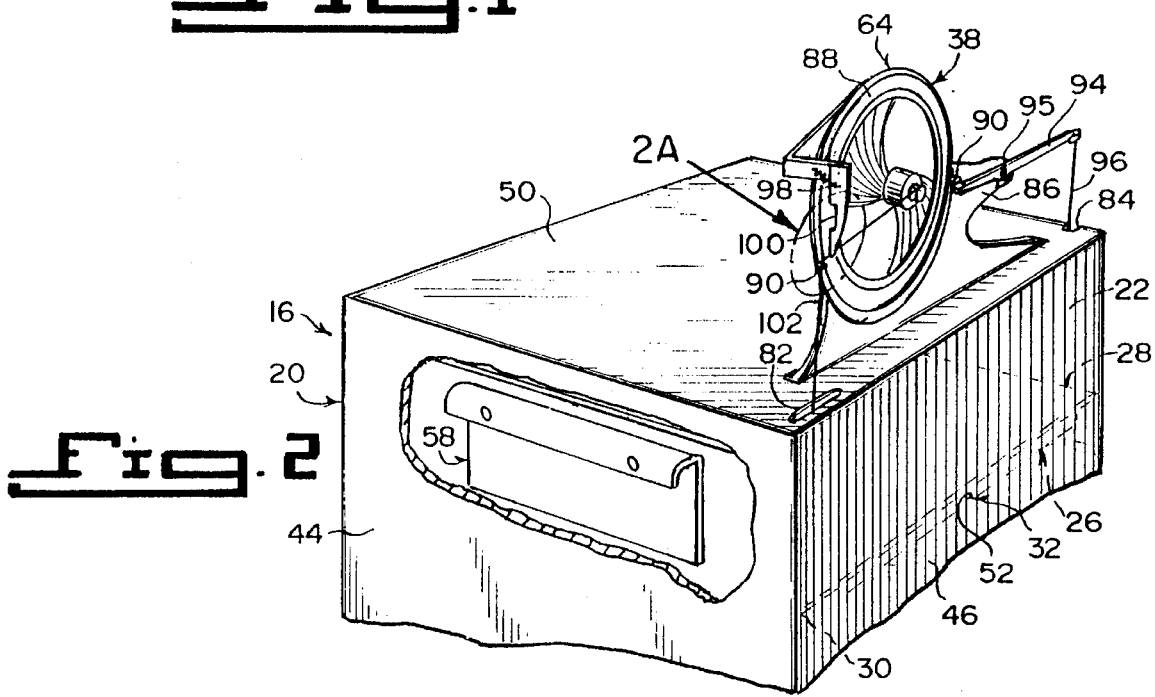
FIG. 2 is a rear perspective view of an upper portion thereof with parts broken away as indicated by arrow 2 in FIG. 1.

FIG. 12 is a left side view of the bait feed switch as indicated by arrow 12 in FIG. 1.

FIG. 13 is a front view of a portion of the bait feed switch with the bait bag removed as indicated by arrow 13 in FIG. 12.

FIG. 14 is a perspective view of the platform switch in the closed position as indicted by arrow 14 in FIG. 1.

FIG. 15 is a perspective view of the platform switch in the opened position as indicated by arrow 15 in FIG. 14.

DETAILED DESCRIPTION OF THE PREFERRED EMBODIMENTS

Turning now descriptively to the drawings, in which similar reference characters denote similar elements throughout the several views, FIGS. 1 through 15 illustrate a trap 16 for rodents 18, such as mice, rats and similar small animals, which consists of a cabinet 20 having an upper entrance 22, to allow the rodents 18 to enter and a lower chamber 24 to retain the rodents. A platform 26 is provided having a first end 28 and a second end 30. A component 32 is for pivotally mounting the platform 26 across its center between the first end 28 and the second end 30 within the cabinet 20. A structure 34 is for maintaining the platform 26 in a normally horizontal position, with its first end 28 level with the upper entrance 22 of the cabinet 20.

A bait bag 36 is suspended in the cabinet 20 directly above the second end 30 of the platform 26, opposite from the upper entrance 22, to attract the rodents 18 onto the second end 30 of the platform 26. An apparatus 38 activated by the rodents 18 eating at the bait bag 36 is for pivoting the second end 30 of the platform downwardly, so that the rodents 18 will drop into the lower chamber 24 of the cabinet 20 and be retained therein. A device 40 activated by the first end 28 of the platform 26 pivoting upwardly, is for returning the platform 26 to its normal horizontal position, after the rodents 18 drop into the lower chamber 24 of the cabinet 20.

The cabinet 20 is box shaped and includes a front wall 42 having the upper entrance 22 therethrough. A rear wall 44, a pair of side walls 46, a bottom wall 48 and a top wall 50 are also provided. The pivotally mounting component 32 is an elongated horizontal shaft 52 extending through the center of the platform 26 and into the side walls 46 of the cabinet 20.

The horizontal maintaining structure 34 contains a magnetic metal bar 54 mounted to the underside of the platform 26 at the first end 28 thereof. A magnet 56 is mounted to the interior surface on the front wall 42 of the cabinet 20, to contact the magnetic metal bar 54 when the platform 26 is in the normally horizontal position.

The trap 16 further includes a sensitive switch 58, having a contact strip 60 and a plurality of prongs 62. The sensitive switch 58 is mounted on the interior surface of the rear wall 44 above the second end 30 of the platform 26. The bait bag 36 is suspended therefrom in front of the prongs 62. When the rodents 18 start eating at the bait bag 36, one of the prongs 62 will be pressed back against the contact strip 60 to activate the pivoting apparatus 38.

The pivoting apparatus 38 is an electromechanical mechanism 64, electrically connected to the sensitive switch 58 attached onto the top wall 50 of the cabinet 20 and mechanically coupled to the platform 26. The electromechanical mechanism 64 when activated by the closing of the sensitive switch 58, will cause the platform 26 to pivot about the elongated horizontal shaft 52 and overcome the attraction of the magnet 56 towards the magnetic metal bar 54.

The returning device 40 is a spring biased normally closed pressure switch 66, electrically connected to the electromechanical mechanism 64 and mounted on the interior surface of the front wall 42 of the cabinet 20. The pressure switch 66 is kept open by the first end 28 of the platform 26 pressing thereon, when in the normally horizontal position. When the first end 28 of the platform 26 is pivoted upwardly, the pressure switch 66 will close to continue to activate the electromechanical mechanism 64, until the platform 26 is back to its normal horizontal position.

The trap 16 further includes an assembly 68 for removing the rodents 18 from the lower chamber 24 of the cabinet 20. The removing assembly 68 consists of the rear wall 44 having an elongated rectangular shaped large door 70 extending thereacross adjacent the bottom wall 48. A hinge 72 is along a top edge of the large door 70 and the rear wall 44, so that the large door 70 can be lifted upwardly to remove the rodents 18 therethrough.

The large door 70 has a square shaped aperture 74 therein. A pair of guide tracks 76 are mounted vertically on opposite sides of the aperture 72. A square shaped small door 78 slides within the guide tracks 76. A handle 80 is at an upper edge of the small door 78, so that the small door 78 can be lifted up and down in the guide tracks 76 to remove the rodents 18 therethrough.

The electromechanical mechanism 64 consists of the top wall 50 of the cabinet 20 having a slot 82 therethrough near one side wall 46 and the rear wall 44. A notch 84 is formed near the respective side wall 46 and at the front wall 42 above the upper entrance 22. An upstanding stanchion plate 86 is mounted on the top wall 50, directly behind and extending between the slot 82 and the notch 84. A pair of oppositely spaced studs 90 are mounted onto a front face of the wheel 88. An internal spur gear 92 is formed in a rear face of the wheel 88.

A trigger arm 94 is pivotally mounted at 95 to the front side of the stanchion plate 86 between the wheel 88 and the front wall 42, to engage with the studs 90 on the wheel 88 above the notch 84. A forward end of the trigger arm 94 will move up and down. A first cable member 96 is affixed between the forward end of the trigger arm 94 and one side of the first end 28 of the platform 26, so as to extend through the notch 84. A throw member 98 having an arch 100 is provided and is affixed to the stanchion plate 86, to extend over the wheel 88 near the rear wall 44. A second cable member 102 is affixed between the center of the wheel 88 and at a slide connection 104 to one side of the second end 30 of the platform 26, so as to extend through the slot 82 and engage with the studs 90.

A housing 106 is on a rear side of the stanchion plate 86. An electric motor 108 is mounted within the housing 106. A gear assembly 110 within the housing is driven by the electric motor 108 and is engagable with the internal spur gear 92 in the wheel 88. A pair of batteries 112 are carried within the housing 106 to power the electric motor, to operate the gear assembly to drive said internal spur gear 92 to rotate the wheel 88 clockwise. When the first stud 90 contacts the trigger arm 94, it will pivot upwardly pulling the first cable member 96 to lift up the first end 28 of the platform 26. The second stud 90 will continue to contact the second cable member 102 and pull it up until the platform 26 is in its normally horizontal position. The throw member 98 will release the second cable member 102 from the second stud 90, so that another cycle can be repeated.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A trap for rodents which comprises:

a) a cabinet having an upper entrance to allow the rodents to enter and a lower chamber to retain the rodents, said cabinet being box shaped and including a front wall having the upper entrance therethrough, a rear wall, a pair of side walls, a bottom wall, and a top wall;

b) a platform having a first end and a second end;

c) means for pivotally mounting said platform across its center between the first end and the second end within said cabinet, said pivotally mounting means is an elongated horizontal shaft extending through the center of said platform and into said side walls of said cabinet;

d) means for maintaining said platform in a normally horizontal position, with its first end level with the upper entrance of said cabinet, said horizontal maintaining means including a magnetic metal bar mounted to the underside of said platform at the first end thereof, and a magnet mounted to the interior surface on said front wall of said cabinet to contact said magnetic metal bar when said platform is in the normally horizontal position;

e) a bait bag suspended in said cabinet directly above the second end of said platform, opposite from the upper entrance to attract the rodents onto the second end of said platform;

f) means activated by the rodents eating at said bait bag, for pivoting the second end of said platform downwardly, so that the rodents will drop into the lower chamber of said cabinet and be retained therein;

g) means activated by the first end of said platform pivoting upwardly, for returning said platform to its normal horizontal position, after the rodents drop into the lower chamber of said cabinet; and h) a sensitive switch having a contact strip and a plurality of prongs, said sensitive switch is mounted on the interior surface of said rear wall above the second end of said platform, in which said bait bag is suspended therefrom in front of the prongs, so that when the rodents start eating at said bait bag one of the prongs will be pressed back against the contact strip to activate said pivoting means.

2. A trap for rodents as recited in claim 1, wherein said pivoting means is a electromechanical mechanism, electrically connected to said sensitive switch, attached onto said top wall of said cabinet and mechanically coupled to said platform, which when activated by the closing of said sensitive switch will cause said platform to pivot about said elongated horizontal shaft and overcome the attraction of said magnet towards said magnetic metal bar.

3. A trap for rodents as recited in claim 2, wherein said returning means is a spring biased normally closed pressure switch, electrically connected to said electromechanical mechanism and mounted on the interior surface of said front wall of said cabinet, said pressure switch is kept open by the first end of said platform pressing thereon when in the normally horizontal position, whereby when the first end of said platform is pivoted upwardly, said pressure switch will close to continue to activate said electromechanical mechanism until said platform is back to its normal horizontal position.

4. A trap for rodents as recited in claim 3, further including means for removing the rodents from the lower chamber of said cabinet.

5. A trap for rodents as recited in claim 4, wherein said removing means includes:
   a) said rear wall having an elongated rectangular shaped large door extending thereacross adjacent said bottom wall; and
   b) a hinge along a top edge of said large door and said rear wall, so that said large door can be lifted upwardly to remove the rodents therethrough.

6. A trap for rodents as recited in claim 5, wherein said removing means further includes:
   a) said large door having a square shaped aperture therein;
   b) a pair of guide tracks mounted vertically on opposite sides of said aperture;
   c) a square shaped small door to slide within said guide tracks; and
   d) a handle at an upper edge of said small door, so that said small door can be lifted up and down in said guide tracks to remove the rodents therethrough.

7. A trap for rodents as recited in claim 5, wherein said electromechanical mechanism includes:

a) said top wall of said cabinet having a slot therethrough near one said side wall and said rear wall and a notch formed near said respective side wall and at said front wall above the upper entrance;

b) an upstanding stanchion plate mounted on said top wall directly behind and extending between said slot and said notch;

c) a wheel rotatively mounted onto a front side of said stanchion plate above said slot and said notch;

d) a pair of oppositely spaced studs mounted onto a front face of said wheel;

e) an internal spur gear formed in a rear face of said wheel;

f) a trigger arm pivotally mounted to the front side of said stanchion plate between said wheel and said front wall, to engage with said studs on said wheel above said notch, so that a forward end of said trigger arm will move up and down;

g) a first cable member affixed between the forward end of said trigger arm and one side of the first end of said platform, so as to extend through said notch;

h) a throw member having an arch and affixed to said stanchion plate to extend over said wheel near said rear wall;

i) a second cable member affixed between the center of said wheel and at a slide connection to one side of the second end of said platform, so as to extend through said slot and engage with said studs;

j) a housing on a rear side of said stanchion plate;

k) an electric motor mounted within said housing;

l) a gear assembly within said housing driven by said electric motor and engagable with said internal spur gear in said wheel; and m) a pair of batteries carried within said housing to power said electric motor, to operate said gear assembly to drive said internal spur gear to rotate said wheel clockwise, so that when said first stud contacts said trigger arm it will pivot upwardly pulling said first cable member to lift up the first end of said platform, while said second stud will continue to contact said second cable member and pull it up until said platform is in its normally horizontal position and said throw member will release said second cable member from said second stud, so that another cycle can be repeated.

* * * * *